(12) United States Patent
Tajima et al.

(10) Patent No.: US 10,778,904 B2
(45) Date of Patent: Sep. 15, 2020

(54) IMAGING DEVICE

(71) Applicant: HITACHI, LTD., Tokyo (JP)

(72) Inventors: Kazuyuki Tajima, Tokyo (JP); Yusuke Nakamura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/289,790

(22) Filed: Mar. 1, 2019

(65) Prior Publication Data

US 2019/0289184 A1   Sep. 19, 2019

(30) Foreign Application Priority Data

Mar. 16, 2018 (JP) .................................. 2018-49062

(51) Int. Cl.
*H04N 5/238* (2006.01)
(52) U.S. Cl.
CPC .................... *H04N 5/238* (2013.01)
(58) Field of Classification Search
CPC .... H04N 5/238; H04N 5/2254; H04N 5/2253; H04N 5/2251; H04N 5/369; H04N 5/23229
See application file for complete search history.

(56) References Cited

U.S. PATENT DOCUMENTS

2009/0250594 A1* 10/2009 Tanaka ................... G02B 5/201
250/208.1
2018/0020153 A1*  1/2018 Funamizu .......... H04N 5/23212

FOREIGN PATENT DOCUMENTS

WO     2017/145348 A1    8/2017

* cited by examiner

*Primary Examiner* — Mekonnen D Dagnew
(74) *Attorney, Agent, or Firm* — Mattingly & Malur, PC

(57) ABSTRACT

An imaging device includes: an image sensor including a plurality of light-receiving elements, configured to generate a sensor image by photoelectrically converting received light through the light-receiving elements; and a modulating unit configured to modulate the intensity of the light received by the image sensor, through a real pattern provided at a predetermined distance from a light-receiving surface of the image sensor, and the imaging device is characterized in that the width of an aperture of the real pattern provided for the modulating unit is determined, based on the predetermined distance and a two-dimensional size of the image sensor.

9 Claims, 10 Drawing Sheets

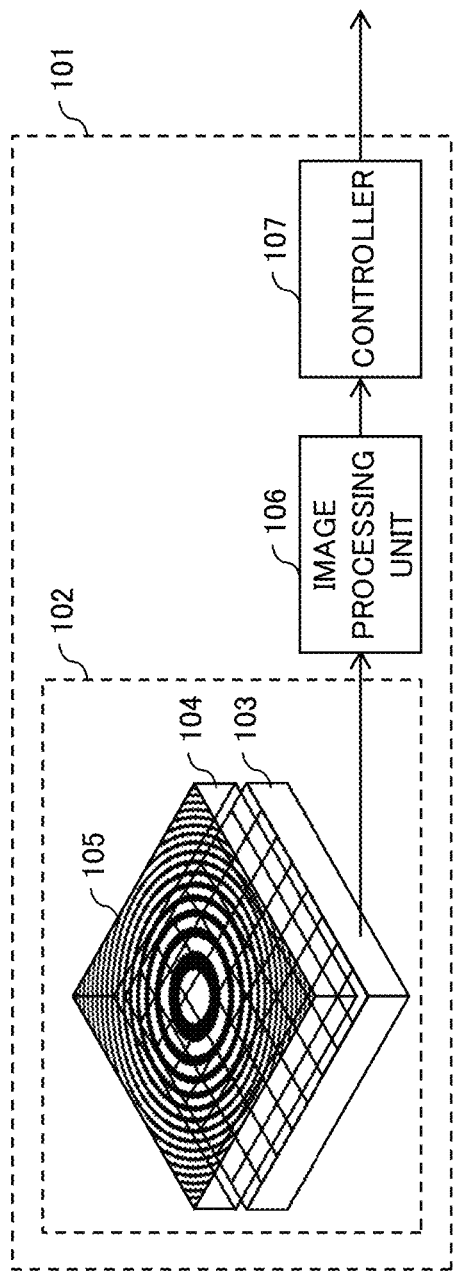

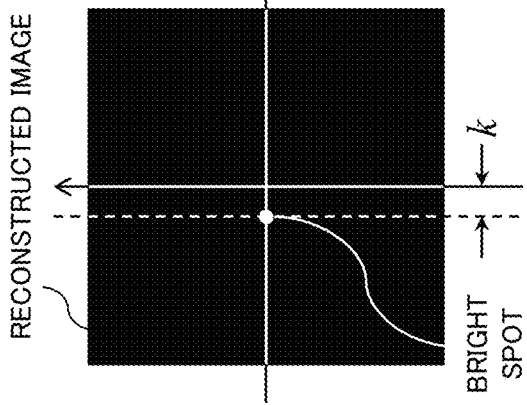
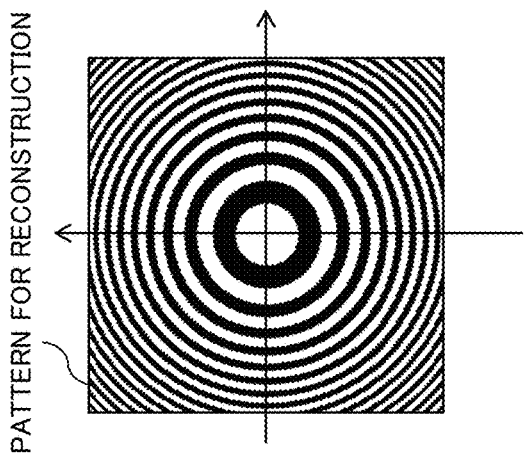
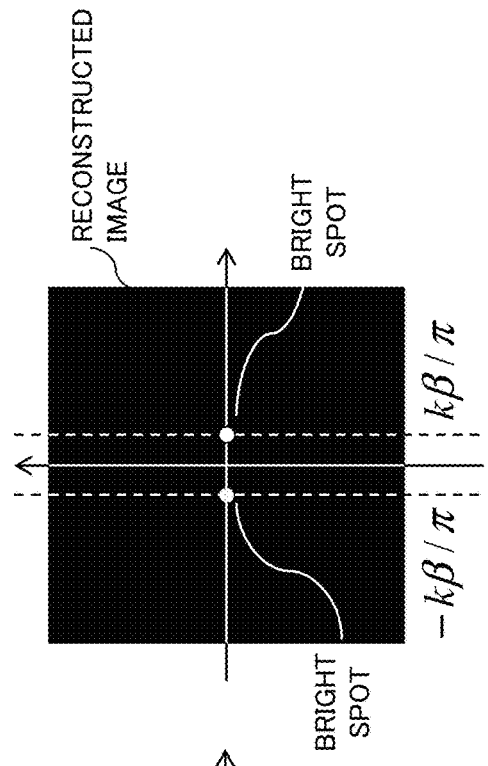
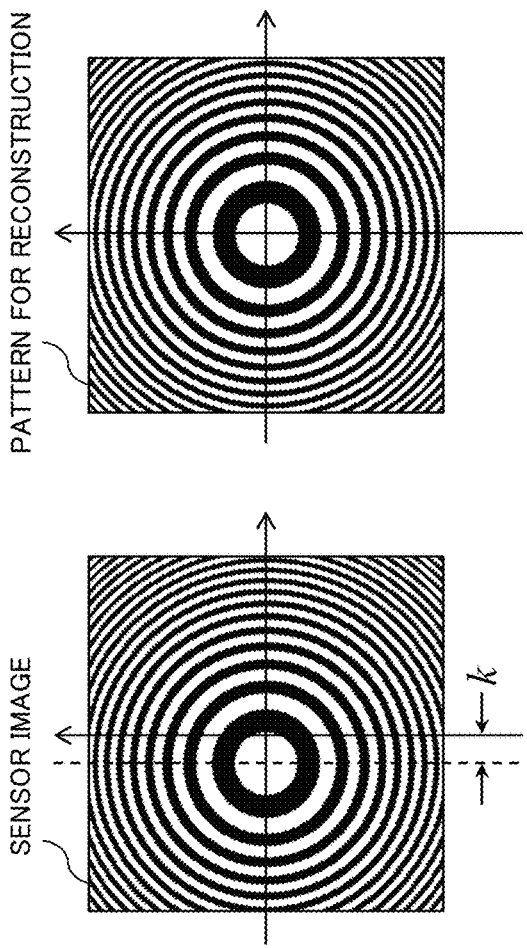
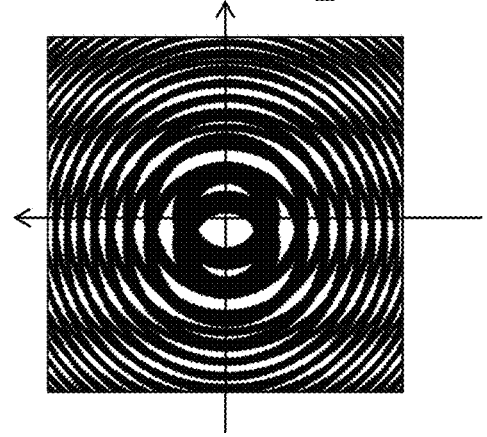

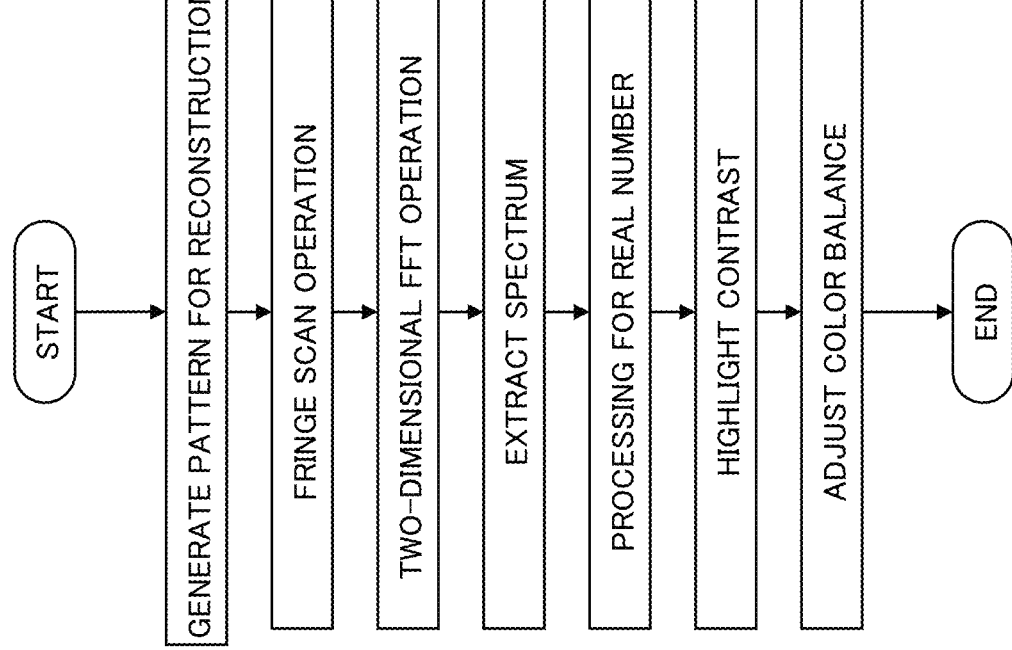
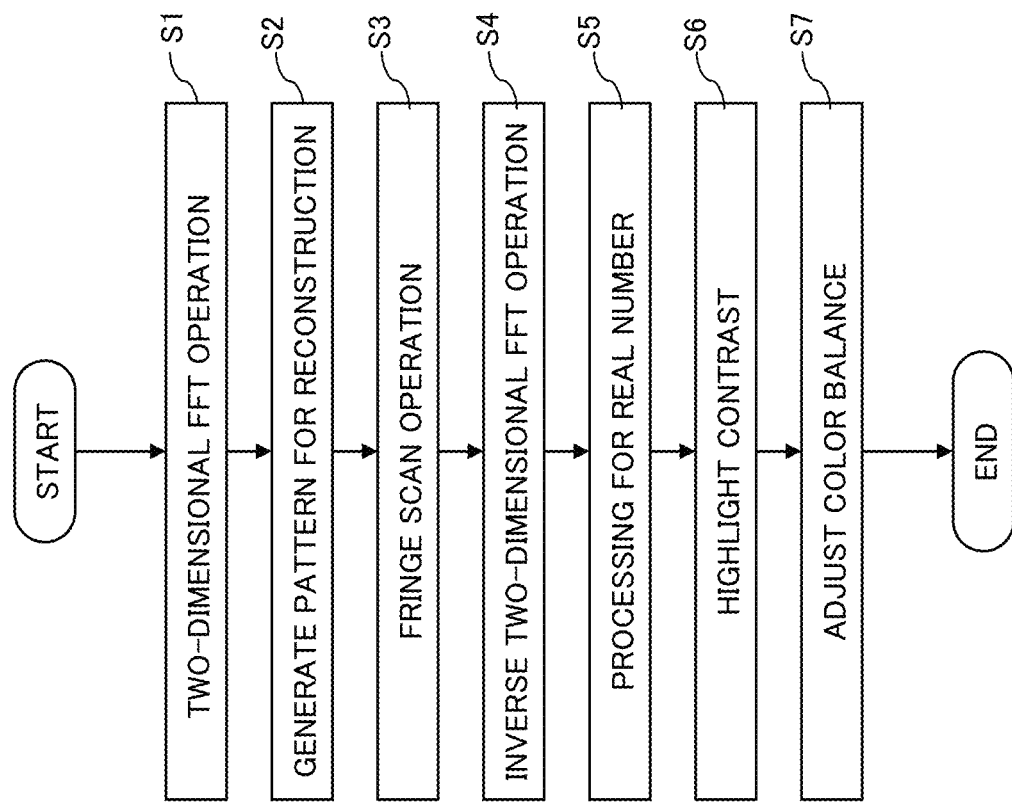

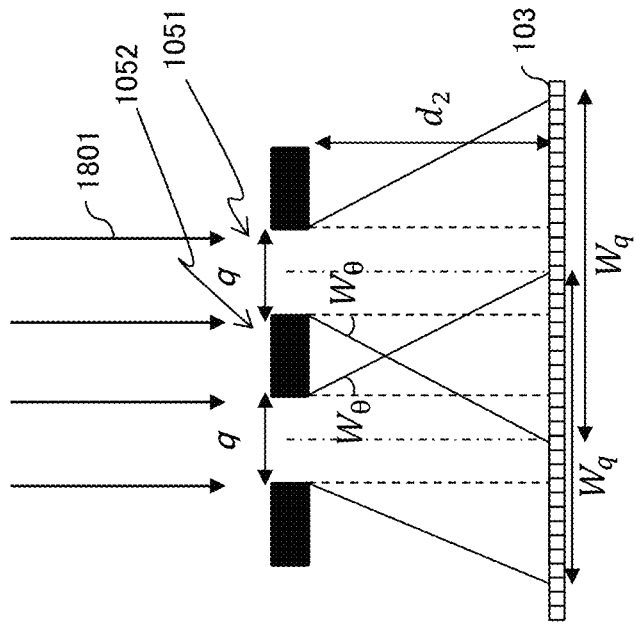
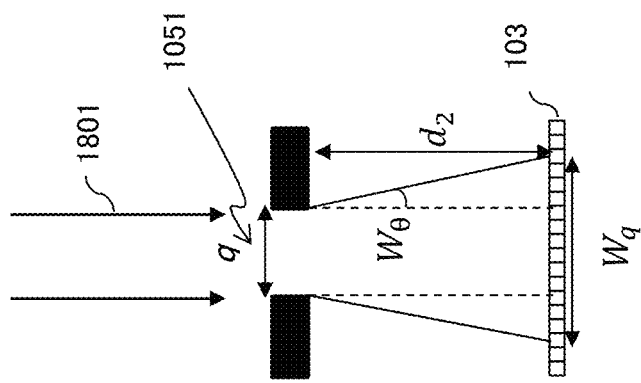

IMAGING DEVICE

This application claims the priority based on the Japanese Patent Application No. 2018-49062 filed on Mar. 16, 2018. The entire contents of which are incorporated herein by reference for all purpose.

BACKGROUND

Technical Field

The present invention relates to an imaging device.

Related Art

Digital cameras mounted in smartphones and the like, vehicle-mounted cameras, and the like are required to have thicknesses reduced and have functions enhanced. As a technique for reducing a camera in thickness, for example, International Publication No. 2017/145348 discloses "an imaging device including an image sensor configured to convert an optical image captured in a plurality of pixels arranged in an array form at an imaging surface, to image signals, and output the image signals, a modulator provided on a light-receiving surface of the image sensor and configured to modulate the intensity of light, and an image processing unit configured to apply image processing to an output image output from the image sensor, characterized in that the modulator includes a grid substrate, and a first grating pattern formed on a first surface of the grid substrate close to the light-receiving surface of the image sensor, the grating pattern is composed of multiple concentric circles each with a pitch made fine in inverse proportion to the distance from reference coordinates, and the multiple concentric circles have no overlap with each other in the grating pattern".

SUMMARY

The imaging device disclosed in International Publication No. 2017/145348 is configured to have a single concentric grating pattern formed, with a pitch made fine in inverse proportion to the distance from the center, modulate again the intensity of light passing through the grating pattern in a concentric fashion with a pitch made fine in inverse proportion to the distance from the center, and obtain an image of an external object from the two-dimensional Fourier transformed image of the resultant modulated image. However, when the concentric grating pattern is excessively fine, light passing through the grating pattern has an overlap on the image sensor, thereby failing to obtain the shadow of the grating pattern, and it may be thus impossible to take advantage of the number of pixels of the image sensor, thereby failing to achieve an increased resolution for the imaging device.

The present invention has been made in view of the foregoing circumstances, and an object of the invention is to allow an increased resolution to be achieved by taking advantage of the number of pixels of an image sensor.

The present application encompasses more than one means for solving at least part of the problem mentioned above, and an example of the means will be given as follows. In order to solve the problem mentioned above, an imaging device according to an aspect of the present invention includes: an image sensor including a plurality of light-receiving elements, configured to generate a sensor image by photoelectrically converting received light through the light-receiving elements; and a modulating unit configured to modulate the intensity of the light received by the image sensor, through a real pattern provided at a predetermined distance from a light-receiving surface of the image sensor, where the width of an aperture of the real pattern provided for the modulating unit is determined, based on the predetermined distance and a two-dimensional size of the image sensor.

According to the present invention, an increased resolution can be achieved by taking advantage of the number of pixels of the image sensor.

Objects, configurations, and advantageous effects other than the foregoing will be evident from the following description of embodiments.

BRIEF DESCRIPTION OF DRAWINGS

FIG. 1 is a diagram illustrating a configuration example of an imaging device as a first embodiment according to the present invention;

FIG. 7 is a diagram illustrating an example of a shadow corresponding to the real pattern in FIG. 5;

FIG. 8 is a diagram illustrating a pattern for reconstruction, corresponding to the real pattern in FIG. 5;

FIG. 9 is a diagram illustrating an example of an image reconstructed by a correlation reconstruction method;

FIG. 10 is a diagram illustrating an example of a moire fringe according to a moire reconstruction method;

FIG. 11 is a diagram illustrating an example of an image reconstructed by a moire reconstruction method;

FIG. 14 is a flowchart for explaining an example of image processing according to a correlation reconstruction method;

FIG. 15 is a flowchart for explaining an example of image processing according to a moire reconstruction method;

FIG. 18 is a diagram illustrating light diffracted at an aperture and projected onto an image sensor;

FIG. 19 is a diagram illustrating an example of light diffracted at adjacent apertures and projected onto the image sensor;

DETAILED DESCRIPTION

Figure 3:
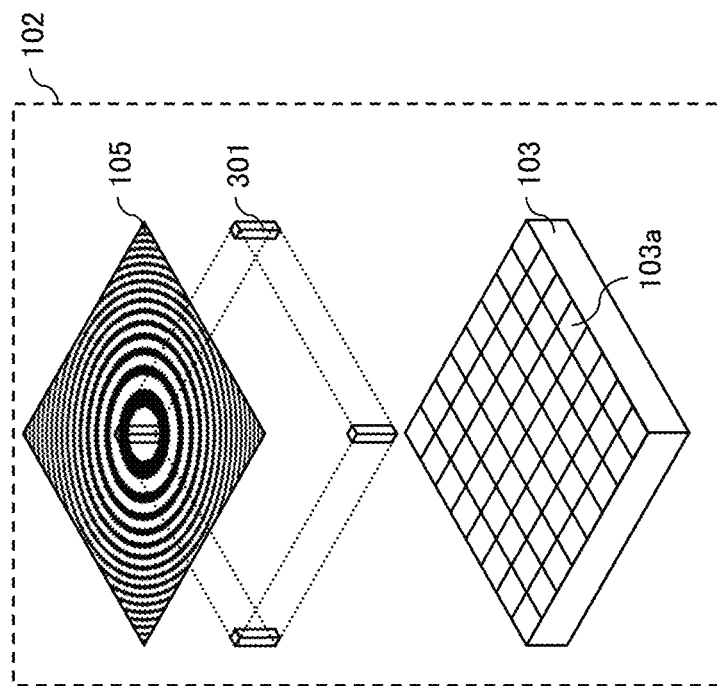
FIG. 3 is a diagram illustrating another configuration example of the imaging unit in the imaging device.

In an embodiment described below according to the present invention, explanations will be given which are divided into multiple sections or embodiments, if necessary, for the sake of convenience. However, unless expressly stated otherwise, the sections or embodiments are not to be considered independent of one another, but one section or embodiment has a relation partially or entirely with the other, such as modification examples, details, and supplemental explanations. In addition, in each embodiment, in the case of referring to the numbers (including numbers, numerical values, amounts, ranges, and the like) of elements, the numbers are not to be considered limited to any specific number, unless expressly stated otherwise, and unless obviously limited to the specific numbers in principle, but may be the specific numbers or more, or less.

Furthermore, in an embodiment according to the present invention, obviously, the constituent elements (also including elemental steps) are not necessarily to be considered indispensable, unless expressly stated otherwise, and unless considered obviously indispensable in principle. Likewise, in each embodiment, in the case of referring to the shapes, positional relationship, and the like of the constituent elements, the shapes and the like are considered including equivalents substantially approximate or similar to the shapes and the like, unless expressly stated otherwise, and unless obviously excluded in principle. The same applies to the numerical values and ranges mentioned above. In addition, throughout all of the drawings for the explanation of embodiments, the same members are denoted by the same reference numerals in principle, and repeated descriptions thereof will be omitted.

An imaging device as an embodiment according to the present invention (hereinafter, referred to as the present embodiment) will be described below with reference to the drawings.

<Configuration Example of Imaging Device as Present Embodiment>

FIG. 1 shows a configuration example of an imaging device as the present embodiment. The imaging device 101 is adapted to capture an image taken by imaging a subject without using any optical lens for providing an optical image of the subject onto an image sensor.

The imaging device 101 includes an imaging unit 102, an image processing unit 106, and a controller 107.

Figure 2:
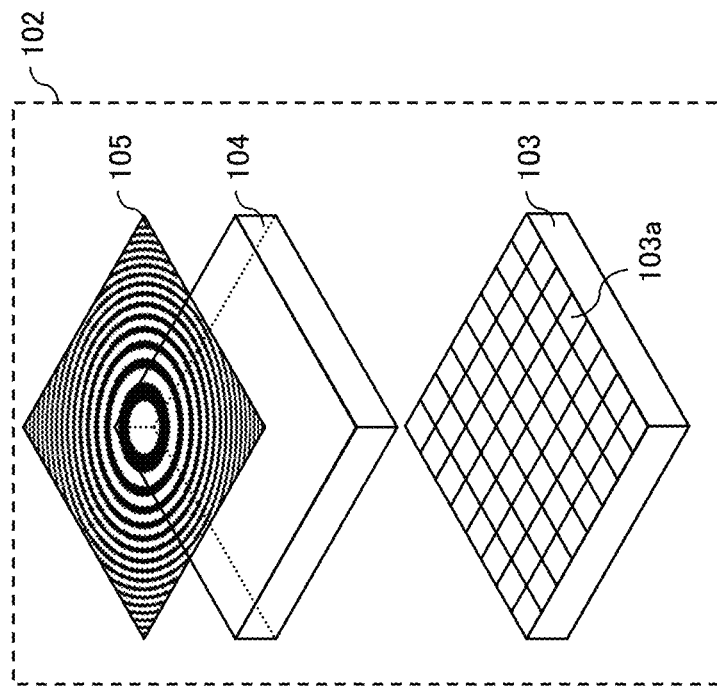
FIG. 2 is a diagram illustrating a configuration example of an imaging unit in the imaging device.

FIG. 2 shows a configuration example of the imaging unit 102. The imaging unit 102 is composed of an image sensor 103, a pattern substrate 104, and a real pattern 105.

The surface of the image sensor 103 has a plurality of light-receiving elements (pixels) 103a arranged regularly in a grid-like form. The image sensor 103 has each light-receiving element 103a that photoelectrically converts incident light to image signals, thereby generating a sensor image composed of the plurality of pixels, and then outputting the sensor image to the image processing unit 106.

The pattern substrate 104 is made of, for example, a material that transmits visible light, such as glass and plastics, one side (hereinafter, referred to as a back surface) of the pattern substrate 104 is fixed in close contact with the light-receiving surface of the image sensor 103, and the real pattern 105 is formed on the side opposite to the surface in close contact with the image sensor 103 (hereinafter, referred to as a surface). It is to be noted that the pattern substrate 104 with the real pattern 105 for imaging formed corresponds to a modulating unit according to the present invention.

The real pattern 105 is formed by vapor deposition of a metal such as aluminum and chromium on the surface of the pattern substrate 104 through, for example, a sputtering method or the like which is used for semiconductor processes. It is to be noted that the real pattern 105 is composed of a part with aluminum or the like vapor-deposited and a pattern without aluminum vapor-deposited, thereby forming a contrast.

It is to be noted that the formation of the real pattern 105 is not to be considered limited to the method described above, but the pattern may be formed by any means, such as, for example, forming a contrast by printing or the like with an ink-jet printer or the like.

In addition, although visible light has been cited as an example in the present embodiment, for example, in the case of shooting with far-infrared rays, which are not visible light, a material that is transparent to a wavelength intended for shooting, e.g., a material that is transparent to far-infrared rays, for example, such as germanium, silicon, or chalcogenide, may be used for the pattern substrate 104, whereas the real pattern 105 may be formed from a material that blocks far-infrared rays.

In the imaging unit 102 configured as described above, the intensity of light that passes through the real pattern 105 is modulated by the contrast of the real pattern 105, and the light is then made incident onto the image sensor 103.

Next, FIG. 3 shows another configuration example of the imaging unit 102. In the configuration example of FIG. 3, the real pattern 105 is formed from a thin film in place of the formation of the real pattern 105 on the surface of the pattern substrate 104, and configured to ensure the distance between the real pattern 105 and the image sensor 103 with supporting members 301.

It is to be noted that the angle of view for shooting is changed depending on the distance between the image sensor 103 and the real pattern 105 in the imaging device 101. Therefore, as long as the configuration example shown in FIG. 3 is adopted for the imaging unit 102 to enable the lengths of the supporting members 301 to be adjusted, shooting is possible with the angle of view changed.

Returning to FIG. 1, the image processing unit 106 applies processing for reconstruction to an image sensor output by the imaging unit 102, and outputs the resultant image to the controller 107. The controller 107 convers, for the output of the image input from the image processing unit 106 to a host computer, an external recording medium, or the like at the subsequent stage which is not shown in the figures, the data format of the image so as to be compatible with an interface such as a USB to which the host computer or the like is connected, and then output the image.

<Imaging Principle in Imaging Device 101>

Next, the imaging principle in the imaging device 101 will be described.

First, the real pattern 105, which is a concentric pattern with a pitch made finer as the distance from the center is increased, is defined by the following formula (1) with the use of a radius r from the reference coordinates as the center of the concentric circle and a coefficient $\beta$.

[Mathematical Formula 1]

$$I(r)=1+\cos\beta r^2 \quad (1)$$

The real pattern 105 shall have a transparent modulated in accordance with the formula (1). The real pattern 105 with such a fringe is referred to as Gabor Zone Plate or Fresnel Zone Plate.

Figure 4:
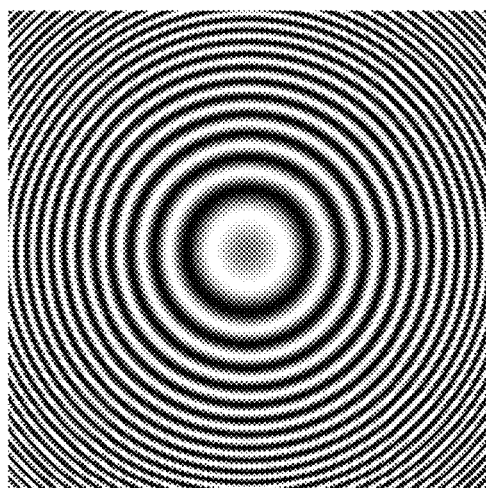
FIG. 4 is a diagram illustrating an example of a real pattern.
Figure 5:
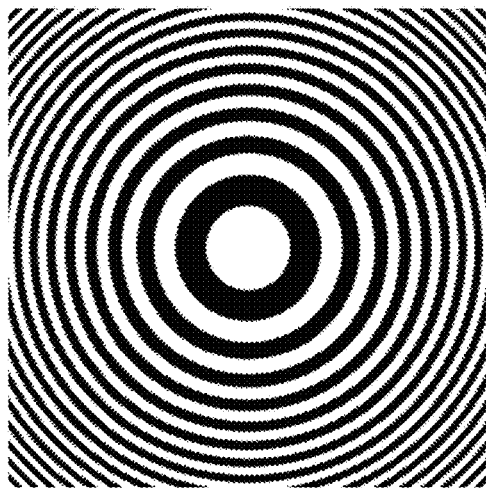
FIG. 5 is a diagram illustrating another example of a real pattern.

FIG. 4 shows an example of Gabor Zone Plate corresponding to the formula (1). FIG. 5 shows an example of Fresnel Zone Plate obtained by binarizing the formula (1) with a threshold value of 1.

It is to be noted that, in the following description, for the sake of simplification, a mention of only the x-axis direction will be made with the use of mathematical formulas, but also treating the y-axis direction as is the case with the x-axis direction makes it possible to see two-dimensional deployment.

Figure 6:
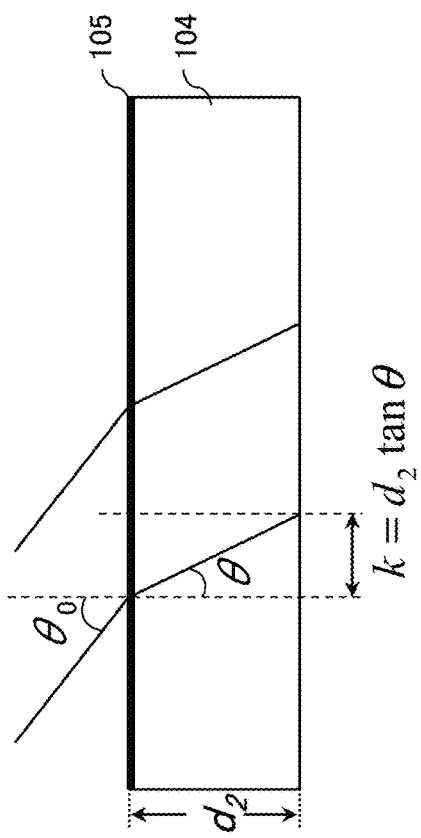
FIG. 6 is a diagram illustrating refraction of oblique incident parallel light at a pattern substrate.

Next, FIG. 6 is a diagram illustrating diffraction of obliquely incident parallel light in the pattern substrate 104.

FIG. 6 shows therein a case in which parallel light enters at an angle $\theta_0$ in the x-axis direction onto the real pattern 105, formed on the surface of the pattern substrate 104 with a thickness $d_2$. In a geometric optical manner, where the refraction angle of light in the pattern substrate 104 is denoted by $\theta$, light multiplied by the transmission of the real pattern 105 formed at the surface enters the image sensor 103, just with a k (=$d_2 \cdot \tan\theta$) shift. In this case, a shadow with the intensity distribution indicated in the following formula (2) is detected on the image sensor 103. The $\Phi$ in the formula (2) represents an initial phase of a transmission distribution in accordance with the formula (1).

[Mathematical Formula 2]

$$I_F(x)=1+\cos[\beta(x+k)^2+\Phi)] \quad (2)$$

FIG. 7 shows an example of the sensor image output from the image sensor 103, based on light that passes through the real pattern 105. As shown in the figure, the sensor image is obtained through the real pattern 105 just with a k shift as in the formula (2).

In the image processing unit 106, the sensor image output from the imaging unit 102 is subjected to processing for reconstruction. The processing for reconstruction is executed by a correlation reconstruction method or a moire reconstruction method.

First, the processing for reconstruction by the correlation reconstruction method (hereinafter, referred to simply as a correlation reconstruction method) will be described.

FIG. 8 shows a pattern 801 for reconstruction for use in the correlation reconstruction method. For the pattern 801 for reconstruction, Gabor Zone Plate or Fresnel Zone Plate is used as well as the real pattern 105. FIG. 9 shows a reconstructed image obtained as a result of the correlation reconstruction method.

In accordance with the correlation reconstruction method, a cross-correlation function between the sensor image (FIG. 7) based on the light passing through the real pattern 105 and the pattern 801 for reconstruction (FIG. 8) is computed, thereby making it possible to obtain the reconstructed image including a bright spot with a shift amount of "k" (FIG. 9).

It is to be noted that typically, the operation quantity will be increased if the cross-correlation operation is performed in accordance with a two-dimensional convolution operation. Thus, in the present embodiment, the cross-correlation operation will be performed through the use of Fourier transform.

The principle of the cross-correlation operation through the use of Fourier transform will be described below. First, Gabor Zone Plate or Fresnel Zone Plate is used for the pattern 801 for reconstruction as well as the real pattern 105, and the pattern 801 for reconstruction can be thus expressed as indicated in the following formula (3) with the use of the initial phase $\Phi$.

[Mathematical Formula 3]

$$I_B(x)=\cos(\beta x^2+\Phi) \quad (3)$$

It is to be noted that the pattern 801 for reconstruction is used in image processing (processing for reconstruction), and thus not required to be offset by 1 as in the formula (1), and may have a negative value.

The Fourier transform of the formulas (2) and (3) are respectively expressed as in the following formulas (4) and (5).

[Mathematical Formula 4]

$$\mathcal{F}[I_F(x)] = \delta(u) + \frac{e^{-iku}}{2\sqrt{\pi\beta}}\sin\left(\frac{u^2}{4\beta}-\Phi+\frac{\pi}{4}\right) \quad (4)$$

[Mathematical Formula 5]

$$\mathcal{F}[I_B(x)] = \frac{1}{2\sqrt{\pi\beta}}\sin\left(\frac{u^2}{4\beta}-\Phi+\frac{\pi}{4}\right) \quad (5)$$

It is to be noted that F, u, and $\delta(\ )$ in the formulas (4) and (5) respectively represent a Fourier transform operation, a frequency coordinate in the x direction, and a delta function.

What is important for the formulas (4) and (5) is that the Fourier transformed formulas also represent Fresnel Zone Plate or Gabor Zone Plate. Therefore, the Fourier transformed pattern 801 for reconstruction may be directly generated on the basis of the formula (5). This direct generation makes it possible to reduce the operation quantity.

Next, the multiplication of the formula (4) by the formula (5) provides the following formula (6).

[Mathematical Formula 6]

$$\mathcal{F}[I_F(x)]\cdot\mathcal{F}[I_B(x)] = \quad (6)$$
$$\frac{1}{2\sqrt{\pi\beta}}\sin\left(\frac{\pi}{4}-\Phi\right)\delta(u) + \frac{e^{-iku}}{4\pi\beta}\cdot\left[\sin^2\left(\frac{u^2}{4\beta}-\Phi+\frac{\pi}{4}\right)\right]$$

The term "$\exp^{(-iku)}$" represented by an exponential function in the formula (6) refers to a signal component, and the Fourier transform of the term provides a result as in the following formula (7), from which a bright spot can be obtained in the location of "k" on the original x axis.

[Mathematical Formula 7]

$$\mathcal{F}^{-1}[e^{-iku}]=2\pi\delta(x+k) \quad (7)$$

This bright spot indicates a light flux at infinity, which is nothing more or less than an image taken by the imaging device 101 in FIG. 1.

It is to be noted that for the correlation reconstruction method, a pattern that is not limited to Fresnel Zone Plate or Gabor Zone Plate, for example, a random pattern, may be adopted as the real pattern 105 or the pattern 801 for reconstruction, as long as the autocorrelation function has a single peak.

Next, the processing for reconstruction by the moire reconstruction method (hereinafter, referred to simply as a moire reconstruction method) will be described.

The moire reconstruction method multiplies the sensor image (FIG. 7) based on the real pattern 105 by the pattern 801 for reconstruction (FIG. 8) to generate the moire fringe shown in FIG. 10, and applies a Fourier transform to the moire fringe, thereby making it possible to obtain a reconstructed image including bright spots with a shift amount of "$k\beta/\pi$", as shown in FIG. 11.

This moire fringe is obtained as indicated in the following formula (8).

[Mathematical Formula 8]

$$I_F(x) \cdot I_B(x) =$$
$$\{1 + \cos[\beta(x+k)^2 + \Phi]\}\cos(\beta x^2 + \Phi) = \frac{1}{2}[2\cos(\beta x^2 + \Phi) + \cos(2\beta x^2 - 2k\beta x + 2\beta k^2 + 2\Phi) + \cos(2k\beta x + \beta k^2)] \quad (8)$$

The third term of the expansion formula of the formula (8) corresponds to a signal component, and it is determined that equally spaced fringes that are straight in a direction in which the two patterns are shifted are generated over the entire surface of the overlapped region. This fringe produced at a relatively low spatial frequency by the overlap between the fringes is referred to as a moire fringe. The two-dimensional Fourier transform of the third term is obtained as indicated in the following formula (9).

[Mathematical Formula 9]

$$\mathcal{F}[\cos 2k\beta x] = \delta\left(u + \frac{k\beta}{\pi}\right) + \delta\left(u - \frac{k\beta}{\pi}\right) \quad (9)$$

F, u, and δ( ) in the formula (9) respectively represent a Fourier transform operation, a frequency coordinate in the x direction, and a delta function. From the formula (9), it is determined that the spatial frequency spectrum of the moire fringe has spatial frequency peaks produced in the locations of $u=\pm k\beta/\pi$. The bright spots indicate light fluxes at infinity, which are nothing more or less than the image taken by the imaging device 101 in FIG. 1.

It is to be noted that for the moire reconstruction method, a pattern that is not limited to Fresnel Zone Plate or Gabor Zone Plate, for example, an ellipsoidal pattern, may be adopted as the real pattern 105 or the pattern 801 for reconstruction, as long as the moire fringe obtained by the pattern shift has a single frequency.

<Noise Cancellation>

The above-described transform from the formula (6) to the formula (7) in the correlation reconstruction method, and transform from the formula (8) to the formula (9) in the moire reconstruction method have been described while focusing on the signal components, but in actuality, the terms other than the signal components can disturb the processing for reconstruction, thereby generating noise. Therefore, noise cancellation based on fringe scan is carried out. The noise cancellation uses the orthogonality of the trigonometric function.

In accordance with the correlation reconstruction method, when the multiplication result of the formula (6) is integrated with respect to Φ as indicated in the following formula (10), the signal term multiplied by a constant will be left with the noise term cancelled.

[Mathematical Formula 10]

$$\int_0^{2\pi} \mathcal{F}[I_F(x)] \cdot \mathcal{F}[I_B(x)] d\Phi = \frac{1}{4\beta} e^{-iku} \quad (10)$$

Likewise, in accordance with the moire reconstruction method, when the multiplication result of the formula (8) is integrated with respect to Φ as indicated in the following formula (11), the signal term multiplied by a constant will be left with the noise term cancelled.

[Mathematical Formula 11]

$$\int_0^{2\pi} I_F(x) \cdot I_B(x) d\Phi = \pi \cos(2k\beta x + \beta k^2) \quad (11)$$

It is to be noted that the formulas (10) and (11) are shown in the form of integral equations, but in actuality, a similar effect can be also achieved by calculating the sum in the combination of multiple types of initial phases Φ that differ in fringe scan. For the combination of the multiple different types of initial phases Φ, the initial phases Φ may be set so as to divide equally between 0 and 2π.

Figure 12:
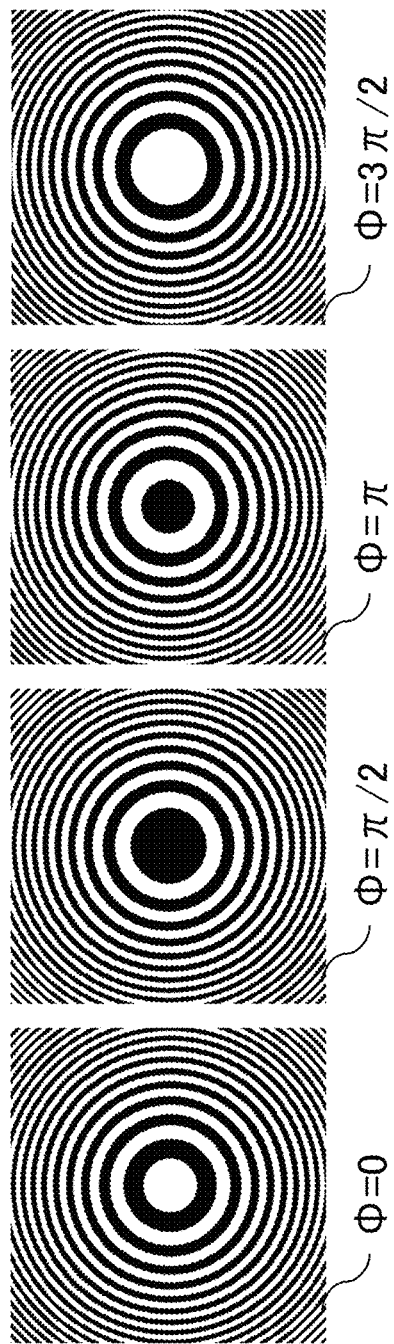
FIG. 12 is a diagram illustrating an example of a combination of initial phases in fringe scan.

FIG. 12 shows an example of a combination of four different types of initial phases Φ for use in fringe scan, which shows real patterns 105 at initial phases Φ=0, π/2, π, and 3π/2 in order from left to right.

For the fringe scan described above, there is a need to use, as the real pattern 105, multiple patterns that differ in initial phase Φ. In order to achieve the use of the multiple patterns, there are a method of switching the real pattern 105 in a time-division manner and a method of switching the real pattern 105 in a spatial division manner.

In the case of time-division fringe scan, for example, a liquid crystal display element capable of electrically switching and displaying the multiple initial phases Φ shown in FIG. 12 may be used as the real pattern 105 in FIG. 1. Further, the time-division fringe scan is adapted such that the imaging unit 102 controls the switching timing of the liquid crystal display element and the shutter timing of the image sensor 103 in synchronization, thereby acquiring four images, and thereafter, the fringe scan operation is performed in the image processing unit 106.

Figure 13:
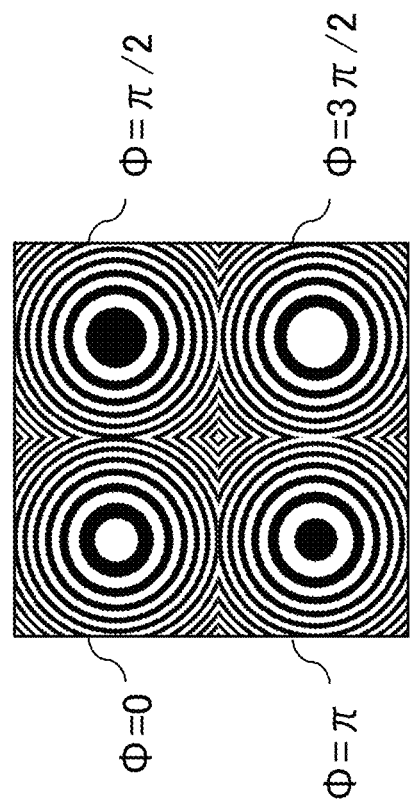
FIG. 13 is a diagram illustrating an example of a real pattern, including multiple concentric circles that differ in initial phase.

On the other hand, in the case of spatial division fringe scan, the real pattern 105 is used which includes multiple patterns that differ in initial phase Φ. FIG. 13 shows an example of the real pattern 105, which includes four types of patterns respectively with initial phase Φ of 0, π/2, π, and 3π/2. Further, the spatial division fringe scan is adapted such that the imaging unit 102 acquires one sensor image acquired through the use of the real pattern 105, and thereafter, in the image processing unit 106, the sensor image is divided for each of regions that differ in initial phase Φ, and the fringe scan operation is performed.

The description of the imaging principle in the imaging device 101 has now come to an end.

<Outline of Image Processing Based on Imaging Principle>

Next, processing for reconstruction based on the imaging principle described above will be described which is executed by the image processing unit 106.

FIG. 14 is a flowchart for explaining an example of processing for reconstruction in a case in which the correlation reconstruction method is adopted in the image processing unit 106.

First, the image processing unit 106 acquires, in the case of time-division fringe scan, multiple sensor images that differ in the initial phase of the real pattern 105, which are output from the image sensor 103 of the imaging unit 102, and performs a two-dimensional fast Fourier transform (FFT (Fast Fourier Transform)) operation for each of the sensor images (step S1). It is to be noted that in the case of spatial division fringe scan, one sensor image output from the image sensor 103 of the imaging unit 102 may be acquired and then divided into four, and a two-dimensional fast Fourier transform operation may be performed for each of the divided sensor images.

Next, the image processing unit 106 generates the pattern 801 for reconstruction for use in processing for reconstruction (step S2), performs the fringe scan operation, based on the formula (10) (step S3), and furthermore performs an inverse two-dimensional FFT operation (step S4).

Next, because the operation results in the step S4 have complex numbers, the image processing unit 106 obtains the absolute values from the complex numbers or extracts the real parts therefrom to reconstruct, as real numbers, the images to be shot (step S5). Thereafter, the image processing unit 106 applies, to the images obtained, processing for contrast highlighting (step S6), and furthermore, processing for color balance adjustment and the like (step S7), and outputs the images as images taken. The processing for reconstruction, executed by the image processing unit 106, has now come to an end.

Next, FIG. 15 is a flowchart for explaining an example of processing for reconstruction in a case in which the moire reconstruction method is adopted in the image processing unit 106.

First, the image processing unit 106 acquires, in the case of time-division fringe scan, multiple sensor images that differ in the initial phase of the real pattern 105, which are output from the image sensor 103 of the imaging unit 102, and generates the pattern 801 for reconstruction for use in processing for reconstruction (step S11). It is to be noted that in the case of spatial division fringe scan, one sensor image output from the image sensor 103 of the imaging unit 102 may be acquired and then divided into four, and the pattern 801 for reconstruction for use in processing for reconstruction may be generated.

Next, the image processing unit 106 performs the fringe scan operation for each sensor image, based on the formula (11) (step S12), furthermore obtains a frequency spectrum through a two-dimensional FFT operation (step S13), and extracts data in a required frequency domain of the frequency spectrum (step S14).

Next, because the data extracted in the step S14 has complex numbers, the image processing unit 106 obtains the absolute values from the complex numbers or extracts the real parts therefrom to reconstruct, as real numbers, the images to be shot (step S15). Thereafter, the image processing unit 106 applies, to the images obtained, processing for contrast highlighting (step S16), and furthermore, processing for color balance adjustment and the like (step S17), and outputs the images as images taken. The processing for reconstruction, executed by the image processing unit 106, has now come to an end.

Example 1

<Method for Determining Coefficient β for Concentric Pattern>

Next, a method for determining the coefficient β for the concentric pattern defined as indicated in the formula (1) will be described.

Figure 16:
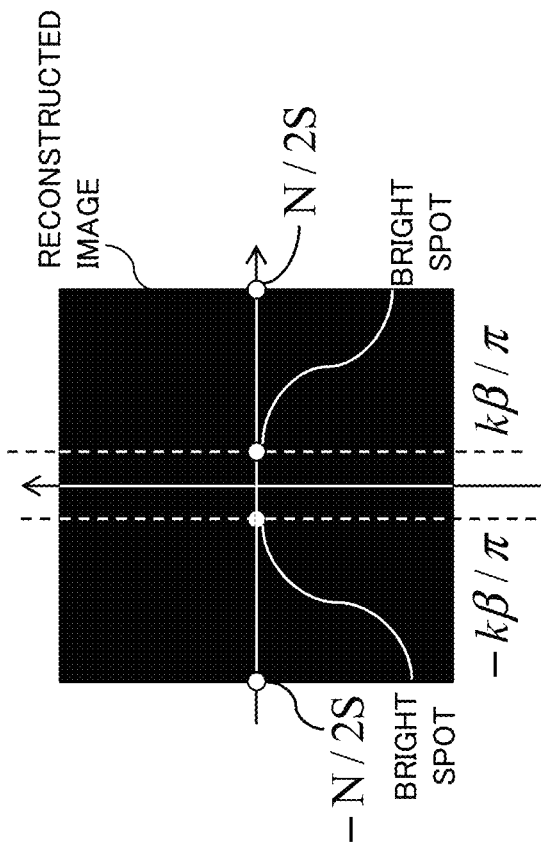
FIG. 16 is a diagram illustrating an example of a reconstructed image in consideration of the resolution according to a moire reconstruction method.

First, for the sake of considering the theoretical limitation of the coefficient β, it is assumed that the number of pixels of the image sensor 103 is N×N, and that the two-dimensional size thereof is S×S. In this case, the reconstructed image shown in FIG. 11 has a pixel N/2S at each end in the x-axis direction as shown in FIG. 16.

There are two factors which limits the location range of the bright spot, and the first factor is the range of ±N/2S defined by the performance (the number of pixels and the two-dimensional size) of the image sensor 103. The second factor is defined by the coefficient β, the maximum possible value of the shift amount k is S, and the possible range of the bright spot location is thus ±βS/π.

For the determination of the resolution in this condition, it is enough to consider the resolution in the frequency space after performing the two-dimensional FFT operation, and the magnitude of the resolution is determined by the size S of the image sensor 103.

Figure 17:
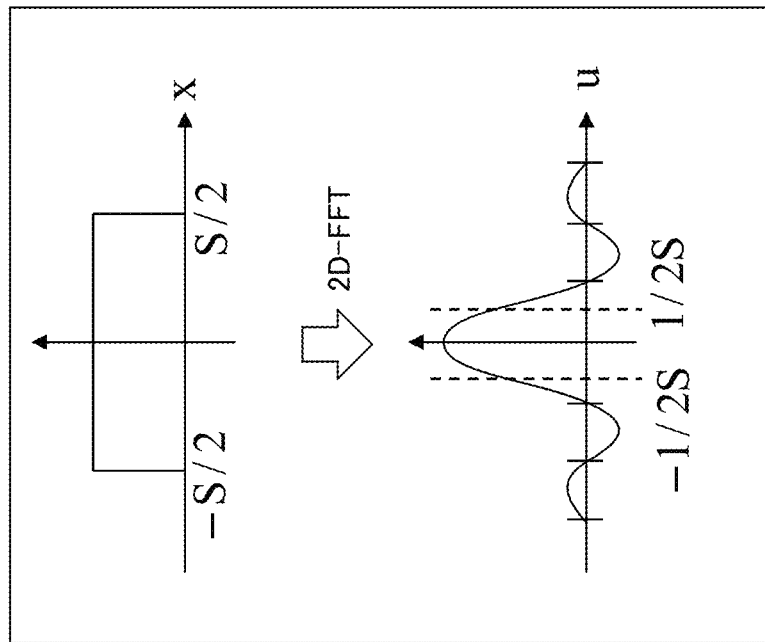
FIG. 17 is a diagram illustrating a resolution subjected to Fourier transform according to a moire reconstruction method.

FIG. 17 shows the resolution of the frequency space, which is calculated in accordance with the size S of the image sensor 103, and the resolution has a full width of 1/S at half maximum. When the location range of the bright spot is divided by the resolution, the resolution can be calculated, and the value defined by the performance of the image sensor 103 is N, and the value defined by the coefficient β is 2βS/π. The magnitude of the resolution is restricted by smaller one of the two factors, and the use of the concentric pattern with the coefficient β, where the two ranges are consistent with each other, thus makes it possible to make effective use of the performance of the image sensor 103.

In this case, the value of the coefficient β can be calculated as indicated in the following formula (12), and the resolution in the case is N×N.

[Mathematical Formula 12]

$$\beta = \frac{\pi N}{2S^2} \qquad (12)$$

<Influence of Diffraction at Real Pattern 105>

In the foregoing description, light passing through the real pattern 105, composed of the concentric pattern, is assumed to be projected onto the image sensor 103 directly (without being diffracted). However, in actuality, the light is diffracted at the real pattern 105, and a blurred pattern is projected onto the image sensor 103.

FIG. 18 shows, in consideration of light diffraction, light passing through an aperture 1051 of the real pattern 105, composed of the concentric pattern, which is diffracted and projected onto the image sensor 103.

In the figure, an incident light beam 1801 will be, in passing through the aperture 1051 of the real pattern 105, expanded at a diffraction angle $W_\theta$ depending on the aperture width q, and projected to have a width of $W_q$ on the image sensor 103. The width $W_q$ can be calculated as indicated in the following formula (13) with the use of approximation, where $d_2$ represents the distance between the real pattern 105 and the image sensor 103, and λ represents the wavelength of the incident light beam 1801.

[Mathematical Formula 13]

$$W_q = q + \frac{2\lambda d_2}{q} \quad (13)$$

In a region where the width $W_q$ is large, the concentric pattern is not projected onto the image sensor 103, and as a result, only a part of the real pattern 105 can be used, thus leading to decreased resolution. If the region where the concentric pattern is projected is S' with respect to the size S of the image sensor 103, the magnitude of the effective coefficient β will be decreased in proportion to the second power of S'/S as can be seen from the formula (12), and in proportion to the magnitude, the resolution will be also decreased.

Therefore, a method will be considered which improves the resolution without decreasing the effective coefficient β.

FIG. 19 shows a case in which light beams passing though adjacent apertures 1051 in the real pattern 105 have influence on each other. In this regard, the apertures 1051 and a non-aperture part 1052 adjacent thereto both have a width of q, which can be calculated by the following formula (14) with the distance r from the concentric pattern center and the coefficient β.

[Mathematical Formula 14]

$$q = \frac{\pi}{2\beta r} \quad (14)$$

It is to be noted that the two adjacent apertures 1051 differ in width in a precise sense because the width of the aperture 1051 changes depending on the distance r from the concentric pattern center, but can be presumed to have the same width because the difference is the sufficiently small. In this case, light passing through the two apertures 1051 just at a center-to-center distance of 2q will be projected on the image sensor 103. When the projection patterns from the two apertures 1051 have an overlap with each other, it will become impossible to treat the projected pattern as a concentric pattern, thereby causing a decrease in resolution.

Therefore, with the value of the coefficient β as an appropriate value, the resolution is improved by preventing the projection patterns from being mixed with each other. For the determination of a limit with which two light beams diffracted from two adjacent light sources can be resolved, for example, a method of using the Rayleigh limit is known. The Rayleigh limit refers to a light with which, when light sources that are comparable in light intensity are viewed at close hand, the light sources can be recognized as two light sources, and the definition of the limit is a case in in which a first dark line diffracted from the first light source reaches the center of the second light source. When this limit is applied to the concentric pattern, a case in which the width of a pattern projected from one of the apertures 1051 reaches 4q is determined to be the limit for the resolution, and the relationship can be calculated by the following formula (15).

[Mathematical Formula 15]

$$q = \sqrt{\frac{2d_2\lambda}{3}} \quad (15)$$

Furthermore, with the use of the formula (14), the coefficient β corresponding to a concentric pattern with a pitch that meets the resolution limit can be calculated as indicated in the following formula (16).

[Mathematical Formula 16]

$$\beta = \frac{\pi}{S\sqrt{\frac{2d_2\lambda}{3}}} \quad (16)$$

As can be seen from the formula (16), the optimum value of the coefficient β depends on S and $d_2$. More specifically, based on the formula (16), the coefficient β is varied depending on the two-dimensional size S of the image sensor 103 constituting the imaging device 101 and the distance $d_2$ between the real pattern 105 and the image sensor 103, thereby making it possible to make effective use of the resolution of the imaging device 101. It is to be noted that the resolution in this case will be determined by smaller one of 2βS/π or N.

It is to be noted that in a case in which the real pattern 105 includes four types of concentric patterns as shown in FIG. 13, the coefficient β is determined for each concentric pattern by replacing the two-dimensional size S of the image sensor 103 with the size (S/2 in the case of FIG. 13) of each concentric pattern.

Example 2

<Method for Improving Resolution in Consideration of Incidence Angle Characteristics of Image Sensor 103>

Next, a method for improving the resolution in consideration of incidence angle characteristics of the image sensor 103 will be described in Example 2 described next.

Figure 20:
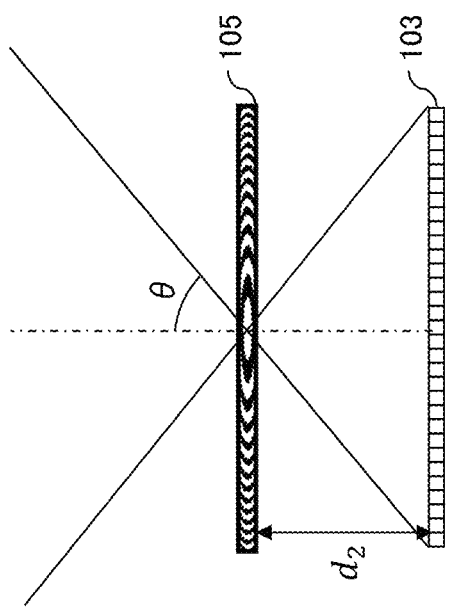
FIG. 20 is a side view of an image sensor and a real pattern.

First, the maximum angle of view for shooting by the imaging device 101 will be described with reference to FIG. 20. FIG. 20 shows a side view of the image sensor 103 and the real pattern 105 that constitute the imaging unit 102.

The angle of view 2θ for the imaging device 101 is defined by lines connecting both ends of the image sensor 103 with the center of the real pattern 105, and the value of the angle can be calculated as indicated in the following formula (17).

[Mathematical Formula 17]

$$2\theta = 2\tan^{-1}\frac{S}{2d_2} \quad (17)$$

Figure 21:
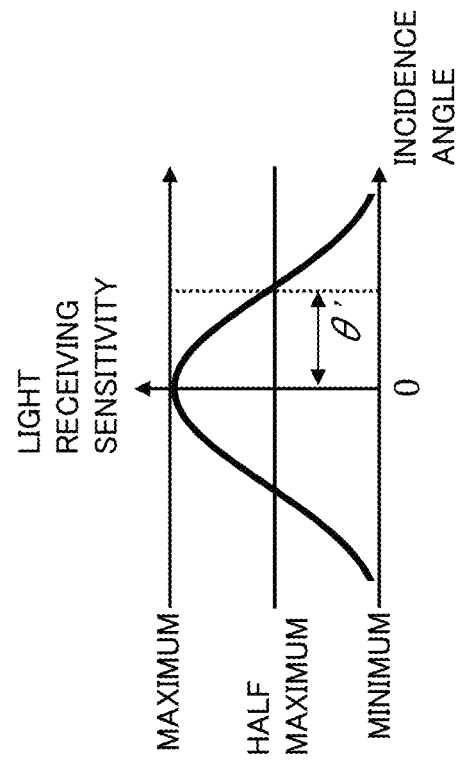
FIG. 21 is a diagram showing an example of typical incidence angle characteristics of an image sensor.

On the other hand, as typical incidence angle characteristics of the image sensor 103, it is known that as shown in FIG. 21, because of the maximum light-receiving sensitivity for light incident at right angle, the light-receiving sensitivity is attenuated as the incidence angle of light is increased.

In this regard, in a case in which the incidence angle at which the light-receiving sensitivity of the image sensor 103 reaches ½ of the maximum value is defined as an incidence angle limit θ' at which the image sensor 103 can receive light, the angle of view, determined by the image sensor 103, is 2θ'.

The incidence angle characteristics are changed depending on the pixel structure, wiring, and the like of the image sensor 103, and thus unique to the image sensor 103 constituting the imaging device 101. If the angle of view 2θ' determined by the image sensor 103 is larger than the angle of view 2θ calculated by the formula (17), no decrease in resolution will be caused, and the resolution in the case will be determined by the coefficient β calculated by the formula (16).

On the other hand, in a case in which the angle of view 2θ' determined by the image sensor 103 is smaller than the angle of view 2θ calculated by the formula (17), a region where shooting is not possible will be produced in the range of the angle of view 2θ for the imaging device 101, thereby leading to a decrease in resolution.

Figure 22:
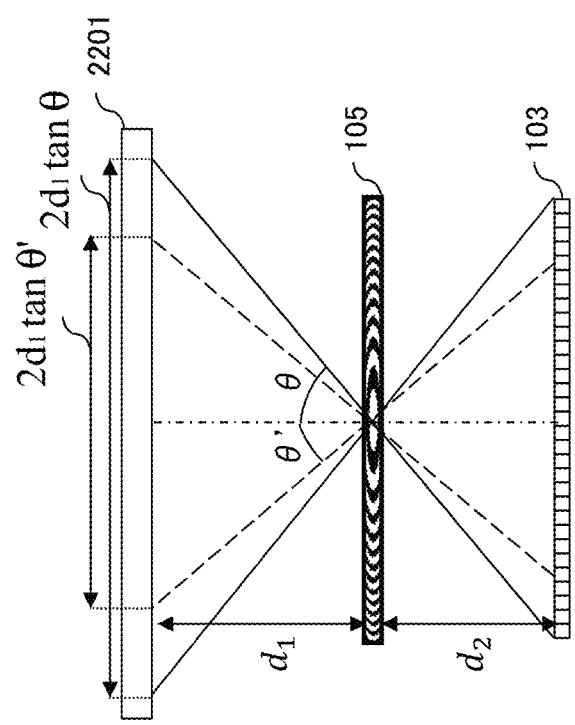
FIG. 22 is a diagram illustrating the field of view for an imaging device, determined by a theoretical angle of view and the incidence angle characteristics of the image sensor.

Next, FIG. 22 is a diagram in which the field of view in accordance with the angle of view 2θ for the imaging device 101 is compared with the field of view in accordance with the angle of view 2θ' determined by the image sensor 103.

As shown in the figure, in the case of taking a shot of a planar subject 2201 at a distance $d_1$ from the real pattern 105, the fields of view are respectively $2d_1 \tan\theta$ and $2d_1 \tan\theta'$.

In a case in which the field of view is changed from $2d_1 \tan\theta$ to $2d_1 \tan\theta'$, how the resolution is decreased can be calculated as $2d_2 \tan\theta'/S$ with the use of the formula (17).

The formula (16) indicates that as the distance $d_2$ is smaller, the coefficient β is increased, and the resolution is increased, but in the case of considering the incidence angle characteristics of the image sensor 103, the optimum value of the distance $d_2$ will be changed depending on the measure of the incidence angle limit θ' for the image sensor 103.

More specifically, in the case of considering the incidence angle characteristics of the image sensor 103, the coefficient β is varied depending on the size S and incidence angle characteristics θ' of the image sensor 103 constituting the imaging device 101 and the distance $d_2$ between the real pattern 105 and the image sensor 103, thereby making it possible to make effective use of the resolution of the imaging device 101.

Therefore, the use of the real pattern 105, which has a coarse pitch depending on the incidence angle characteristics of the image sensor 103, makes it possible to improve the resolution of the imaging device 101. As a result, the shadow of the width projected from the minimum aperture width q of the real pattern 105 to the image sensor 103 has a size of 4q or less.

Example 3

<Width Ratio Between Aperture 1051 and Non-Aperture Part 1052 of Real Pattern 105>

In Examples 1 and 2 described above, the aperture 1051 and non-aperture part 1052 of the real pattern 105 are assumed to have a width ratio of 1:1. A method of increasing the resolution by changing the width ratio between the aperture 1051 and non-aperture part 1052 of the real pattern 105 will be described below as Example 3.

Figure 23:
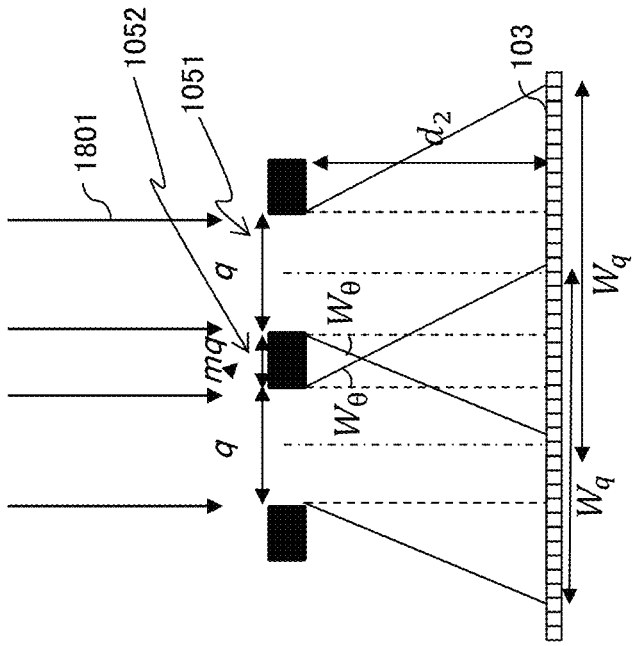
FIG. 23 is a diagram illustrating an example of light diffracted at adjacent apertures of a real pattern, where an aperture and a non-aperture part are not 1:1 in width, and projected onto an image sensor.

FIG. 23 shows light diffracted at the real pattern 105, composed of a concentric pattern, and projected onto the image sensor 103, in a case in which two adjacent apertures 1051 of the real pattern 105 and a non-aperture part 1052 between the two adjacent apertures respectively have a width of q and a width of mq.

In this case, as for the intensity of light reaching the image sensor 103, if the average value therefor is regarded as a threshold value, the ratio is not 1:1 between the intensity of a dark part below the threshold value and the intensity of a light part above the threshold value. In addition, the width q of the aperture 1051 of the real pattern 105 will be, if the average value for the intensity of light reaching the image sensor 103 is regarded as a threshold value, determined on the basis of the ratio between the intensity of the dark part below the threshold value and the intensity of the light part above the threshold value.

In the figure, when the Rayleigh limit is used as in Example 1, a condition in which the width of a pattern projected from one of the apertures 1051 reaches 2q+2mq is determined to be the limit for the resolution, and the relationship can be calculated as indicated in the following formula (18).

[Mathematical Formula 18]

$$q = \sqrt{\frac{2d_2\lambda}{1+2m}} \qquad (18)$$

In addition, in this case, the width q of the aperture 1051 and the width mq of the adjacent non-aperture part 1052 can be calculated as indicated in the following formula (19) with the distance r from the center of the concentric pattern and the coefficient β.

[Mathematical Formula 19]

$$q = \frac{\pi}{\beta r(1+m)} \qquad (19)$$

Furthermore, the coefficient β corresponding to a concentric pattern with a pitch that meets the resolution limit can be calculated as indicated in the following formula (20).

[Mathematical Formula 20]

$$\beta = \frac{\pi}{S(1+m)\sqrt{\frac{2d_2\lambda}{1+2m}}} \qquad (20)$$

As can been seen from the formula (20), the optimum value of the coefficient β varies depending on S, $d_2$, and m. More specifically, the coefficient β is varied depending on the two-dimensional size S of the image sensor 103 constituting the imaging device 101, the distance $d_2$ between the real pattern 105 and the image sensor 103, and the ratio m between the aperture 1051 and non-aperture part 1052 of the real pattern 105, thereby making it possible to make the best use of the resolution of the imaging device 101. It is to be noted that the resolution in this case will be determined by smaller one of $2\beta S/\pi$ or N.

Example 4

<Supplement in the Case of Adopting Spatial Division Fringe Scan>

In Examples 1 to 3 described above, the two-dimensional size S of the image sensor 103 is used as a method for optimizing the coefficient β of the real pattern 105. However, in the case of performing the spatial division fringe scan described above, the real pattern 105 includes therein multiple concentric patterns, and it is thus desirable to use, as a factor that determines the coefficient β, the two-dimensional size of the multiple concentric patterns included in the real pattern 105, rather than the two-dimensional size of the image sensor 103.

In a case in which Ψ represents the two-dimensional size of the multiple concentric patterns included in the real pattern 105, the formulas (16) and (20) described above can be expressed respectively as in the formulas (21) and (22).

[Mathematical Formula 21]

$$\beta = \frac{\pi}{\Psi\sqrt{\frac{2d_2\lambda}{3}}} \quad (21)$$

[Mathematical Formula 22]

$$\beta = \frac{\pi}{\Psi(1+m)\sqrt{\frac{2d_2\lambda}{1+2m}}} \quad (22)$$

In addition, in a case in which the real pattern 105 includes therein multiple concentric patterns that differ in size, the use of a different coefficient β for each concentric pattern makes it possible to make effective use of the resolution of the imaging device 101.

It is to be noted that the present invention is not to be considered limited to the embodiment described above, but various modification can be made thereto. For example, the embodiment mentioned above have been described in detail for clearly explaining the present invention, but are not necessarily to be considered limited to the inclusion of all of the configurations described.

In addition, the respective configurations, functions, processing units, processing means, etc. mentioned above may be partially or entirely achieved with hardware, for example, by designing with integrated circuits. In addition, the respective configurations, functions, etc. mentioned above may be achieved with software in a way that a processor interprets and executes programs for achieving the respective functions. Information such as programs, tables, and files for achieving the respective functions can be stored on recording devices such as memories, hard disks, SSD (Solid State Drive), or recording media such as IC cards, SD cards, and DVDs.

In addition, the control lines and information lines are shown which are considered required for the sake of explanation, but all of the control lines and information lines required for a product are not always shown. In fact, it is conceivable that almost all of the configurations are interconnected.

What is claimed is:

1. An imaging device comprising:
an image sensor comprising a plurality of light-receiving elements, the image sensor configured to generate a sensor image by photoelectrically converting received light through the light-receiving elements; and
a modulating unit configured to modulate an intensity of the light received by the image sensor, through a real pattern, that is a flat component, provided at a predetermined distance from a light-receiving surface of the image sensor by a supporting member of a predetermined length disposed between the flat component of the real pattern and the light-receiving surface of the image sensor, wherein a width of an aperture of the real pattern provided for the modulating unit is determined based on the predetermined distance and a two-dimensional size of the image sensor.

2. The imaging device according to claim 1, comprising:
an image processing unit configured to generate an image taken by imaging a subject, through processing for reconstruction with use of the sensor image and a pattern for reconstruction.

3. The imaging device according to claim 1,
wherein the real pattern provided for the modulating unit comprises a concentric pattern configured to make the width of the aperture finer as a distance from reference coordinates is increased.

4. The imaging device according to claim 3,
wherein the real pattern provided for the modulating unit comprises multiple concentric patterns.

5. The imaging device according to claim 4,
wherein for each of the multiple concentric patterns included in the real pattern, the width of the aperture is determined, based on the predetermined distance and a two-dimensional size of each concentric pattern.

6. The imaging device according to claim 1,
wherein a width achieved when first-order diffracted light diffracted at the aperture of the real pattern reaches the image sensor is four times or less as large as the width of the opening.

7. The imaging device according to claim 1,
wherein a width achieved when first-order diffracted light diffracted at the aperture of the real pattern reaches the image sensor is four times as large as the width of the opening.

8. The imaging device according to claim 1,
wherein in a case in which an average value for an intensity of light that reaches the image sensor through the real pattern in the modulating unit is regarded as a threshold value, a ratio is not 1:1 between a value below the threshold value and a value above the threshold value.

9. The imaging device according to claim 8,
wherein the width of the aperture of the real pattern in the modulating unit is determined, based on the ratio between the value below the threshold value and the value above the threshold value.

* * * * *